(12) United States Patent
Silbernagel et al.

(10) Patent No.: US 8,543,498 B2
(45) Date of Patent: Sep. 24, 2013

(54) METHOD AND SYSTEM FOR DESIGNATING AND TRACKING FEATURE SETS FOR INDIVIDUAL ACCOUNTS

(75) Inventors: Mark Mathias Silbernagel, Battle Ground, WA (US); Rene Pierre Babi, Vancouver, WA (US)

(73) Assignee: Aurora Financial Systems, Inc., Purchase, NY (US)

( * ) Notice: Subject to any disclaimer, the term of this patent is extended or adjusted under 35 U.S.C. 154(b) by 142 days.

(21) Appl. No.: 11/522,432

(22) Filed: Sep. 18, 2006

(65) Prior Publication Data

US 2007/0073616 A1 Mar. 29, 2007

Related U.S. Application Data

(60) Provisional application No. 60/717,773, filed on Sep. 19, 2005.

(51) Int. Cl.
*G06Q 40/00* (2012.01)
(52) U.S. Cl.
USPC .............................................. 705/40; 705/35
(58) Field of Classification Search
USPC .................................................... 705/35, 40
See application file for complete search history.

(56) References Cited

U.S. PATENT DOCUMENTS

| | | | | |
|---|---|---|---|---|
| 5,970,478 | A * | 10/1999 | Walker et al. .................... | 705/35 |
| 6,254,000 | B1 * | 7/2001 | Degen et al. .................. | 235/380 |
| 6,325,292 | B1 * | 12/2001 | Sehr .............................. | 235/492 |
| 2004/0078326 | A1 * | 4/2004 | Strydom et al. ................ | 705/39 |
| 2004/0162737 | A1 * | 8/2004 | Ikeda et al. ....................... | 705/1 |

OTHER PUBLICATIONS

Schott, Steve, Gregg, Leigh; "The plastic thief: preventing credit card fraud"; May 15, 1995; ISSN: 0011-1058.*
Bank_Technology_News; "Fraud Prevention Meets Customer Service at Chase"; May 1992; ISSN: 1060-3506.*

* cited by examiner

*Primary Examiner* — Edward Chang
(74) *Attorney, Agent, or Firm* — Maryam Imam; IPxLAW Group LLP

(57) ABSTRACT

A improved method of managing feature sets associated with credit card account numbers includes (1) storing in a first database a plurality of credit card account numbers, wherein each credit card account number comprises a bank identification number (BIN), a sub-BIN, an account number and a verification or validation value, (2) storing in a second database a list of tracking numbers, wherein each tracking number represents a group of credit card account features, and wherein each feature is assigned a unique identification number, and (3) associating individual ones of the tracking numbers to individual ones of the credit card account numbers such that such individual credit card account numbers are each associated with a predetermined feature set.

28 Claims, 3 Drawing Sheets

FIG. 3

| BIN | SUB-BIN | ACCT# | LUHN |
|---|---|---|---|
| XXXXXX | XXX | 123456 | X |
| | XXY | 123457 | Y |
| | XXZ | 123458 | Z |

| SUB-BIN | FEATURES |
|---|---|
| XXX | A, B, C |
| XXX | A, B, C |
| XXX | A, B, C |
| YYY | B, D, E |
| YYY | B, D, E |
| YYY | B, D, E |

FIG. 4

| BIN | SUB-BIN | ACCT# | LUHN | TRACKING# |
|---|---|---|---|---|
| XXXXXX | XXX | 123456 | X | CB-001 |
| | XXY | 123457 | Y | CB-003 |
| | XXZ | 123458 | Z | CB-001 |

| TRACKING# | FEATURES |
|---|---|
| CB-001 | 004, 005, 020 |
| CB-002 | 103 |
| CB-003 | 004, 008, 205 |
| CB-004 | 004, 005 |
| CB-005 | 001, 002, 003 |
| CB-006 | 301, 401, 501 |

METHOD AND SYSTEM FOR DESIGNATING AND TRACKING FEATURE SETS FOR INDIVIDUAL ACCOUNTS

This application claims the benefit of U.S. Provisional Application No. 60/717,773, filed Sep. 19, 2005, which is herein incorporated by reference in its entirety.

BACKGROUND OF THE INVENTION

Traditionally, as shown in FIG. 1, conventional credit cards are assigned a "Bank Identification Number" (BIN) by the American Banking Association (ABA), which acts as a US agent of the international standards organization (ISO). The ISO acts as the global custodian of BINs. A BIN identifies a card's issuing financial institution and typically consists of the first 6 digits of a card's number, which full number length is often 16 digits (more or less) as commonly seen on cards such as Visa and MasterCard, etc.

The 'rails', or network communications systems, which connect the retail sales environment (merchants) to the card/account institutions (FI's, or issuers) make use of the BIN to route each financial transaction to the appropriate FI/issuer for approval. More specifically, as shown in FIG. 2, when, for example, a card is used for a purchase, a retailer passes a message (including the card number) to a communications network. The network, based on the card's BIN, is able to properly route the message to the appropriate FI/issuer, namely X, Y or Z.

Each FI/issuer associates various features with their cards/accounts, usually assigning those features available to cards within part or all of a range of numbers within a BIN. For example, if the next three digits beyond the first six (BIN) were used to identify a sub-BIN for a given feature set, the allocation of a BIN would look like this for a 16-digit BIN:

| --BIN-- | --subBIN-- | --card number-- | --CRC-- |
|---------|------------|-----------------|---------|
| 123456  | 123        | 123456          | 1       |

This means that for sub-BIN "123", the issuer has reserved six digits (10 to the $6^{th}$ power, or 1,000,000 possible) potential card/account numbers, even if only ONE is ever used to implement a given feature set associated with, e.g., sub-BIN 123. As can be readily appreciated, this common practice makes unavailable a significant portion of the BIN for use by other feature combinations, regardless of how many are actually (ever) used. In this example, there could be 1,000 (000-999) sub-BINs, each having between zero and 1 million active cards.

FIG. 3 illustrates a common implementation of an account database in accordance with the prior art. A master database, or table, typically includes fields for BIN, SUB-BIN, account number and CRC or Luhn (which is used to validate and/or verify the accuracy of credit-card numbers, as is well known in the art). A sister table associates features (e.g., features A, B, C, etc.) with respective SUB-BINs. Features might include, the interest rate, the maximum allowable credit, promotions "points" programs, and the like.

If a large number of sub-BINs were anticipated (i.e., many different sets of feature combinations), the percentage of numbers allocated for various feature sets but not actually associated with an active card could easily rise above 80-90%. While this may just seem to be an inefficient but necessary (and historical) nuisance, the number of BINs available internationally is actually limited, and the ISO group responsible for issuing them is actively seeking the return of unused BINs as the supply of available (remaining) unassigned BINs has diminished. Accordingly, a more efficient means of utilizing available number space within the BIN system is desirable.

SUMMARY OF THE INVENTION

Embodiments of the present invention adopt a "Bill of Materials" approach to associate a combination or set of features with one "top level" identification (tracking) ID—which can then be assigned to an entire BIN, a sub-BIN, or any arbitrary range of numbers, even individual numbers, to indicate which feature set or sets are associated with the cards/accounts so assigned.

In this way, no numbers (i.e., entire BINs or Sub-BINs) need be reserved for a particular feature set prior to use, and the range of numbers associated with a given feature set may vary from zero to all, inclusive of every whole number in between. Moreover, it is not required that the tracking ID or number be applied in any sequence or consecutively. The tracking numbers can be assigned randomly throughout a BIN.

Furthermore, the use of a tracking number in accordance with the present invention also provides benefits beyond card numbers/accounts and transaction processing, since the tracking number can also be used to indicate and track which literature might need to accompany the card when it is shipped to the consumer, which marketing organization or merchant sold the card, which regulatory disclosures accompany the card, what recordings/behavior the cardholder encounters when using an IVR (interactive voice response) system by phone, how a call is answered and processed by human operators at a call center, or the look/feel and features offered at a website via the internet, among many other possible uses.

Further features of the invention, its nature and various advantages will be more apparent from the accompanying drawings and the following detailed description of the preferred embodiments.

BRIEF DESCRIPTION OF THE DRAWINGS

FIG. 3 depicts the prior art approach to account databases.

FIG. 4 depicts an embodiment of an account database approach in accordance with the present invention.

DETAILED DESCRIPTION OF THE INVENTION

Figure 1:
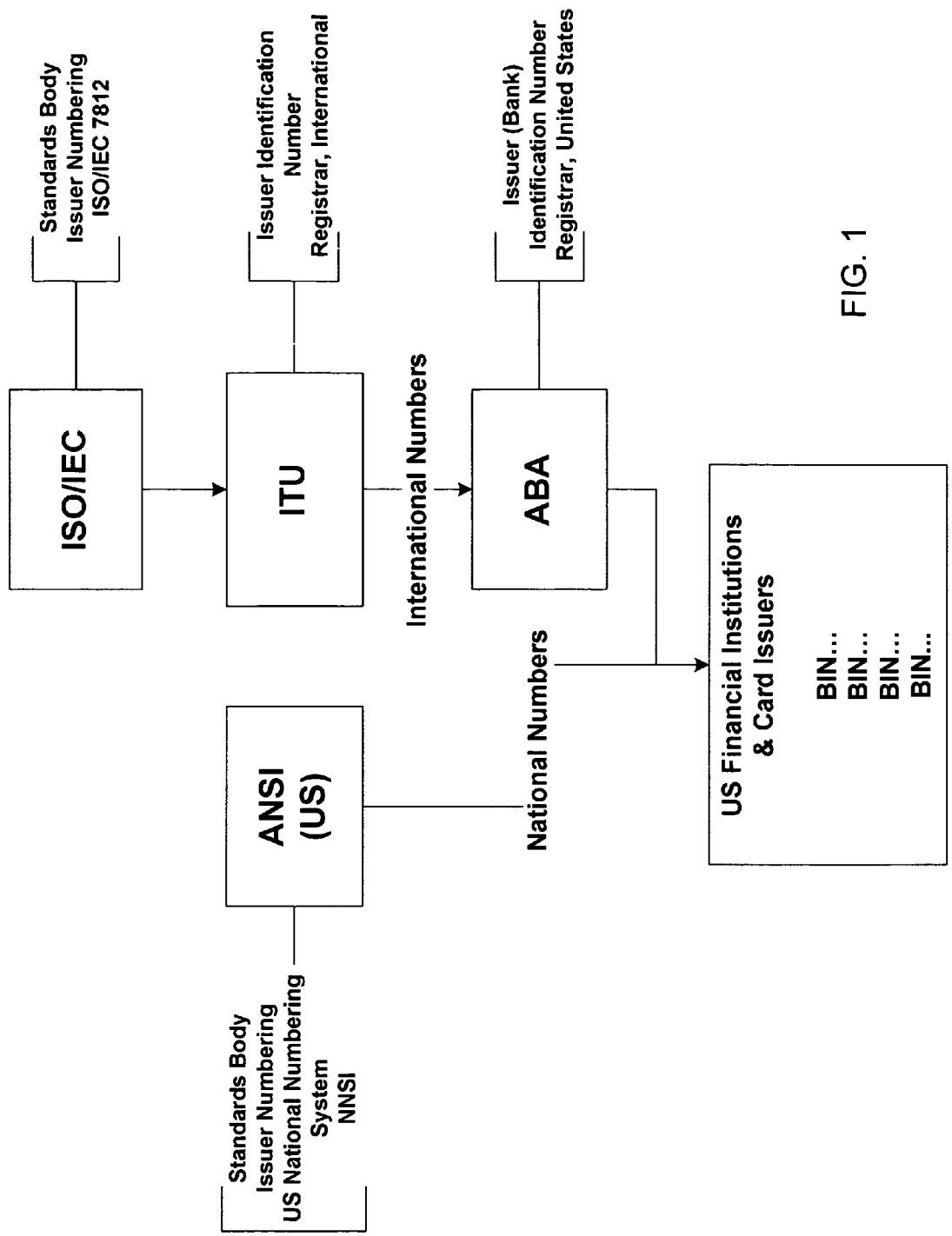
FIG. 1 shows the hierarchy of organizations that are responsible for tracking and assigning Bank Identification Numbers (BINs).
Figure 2:
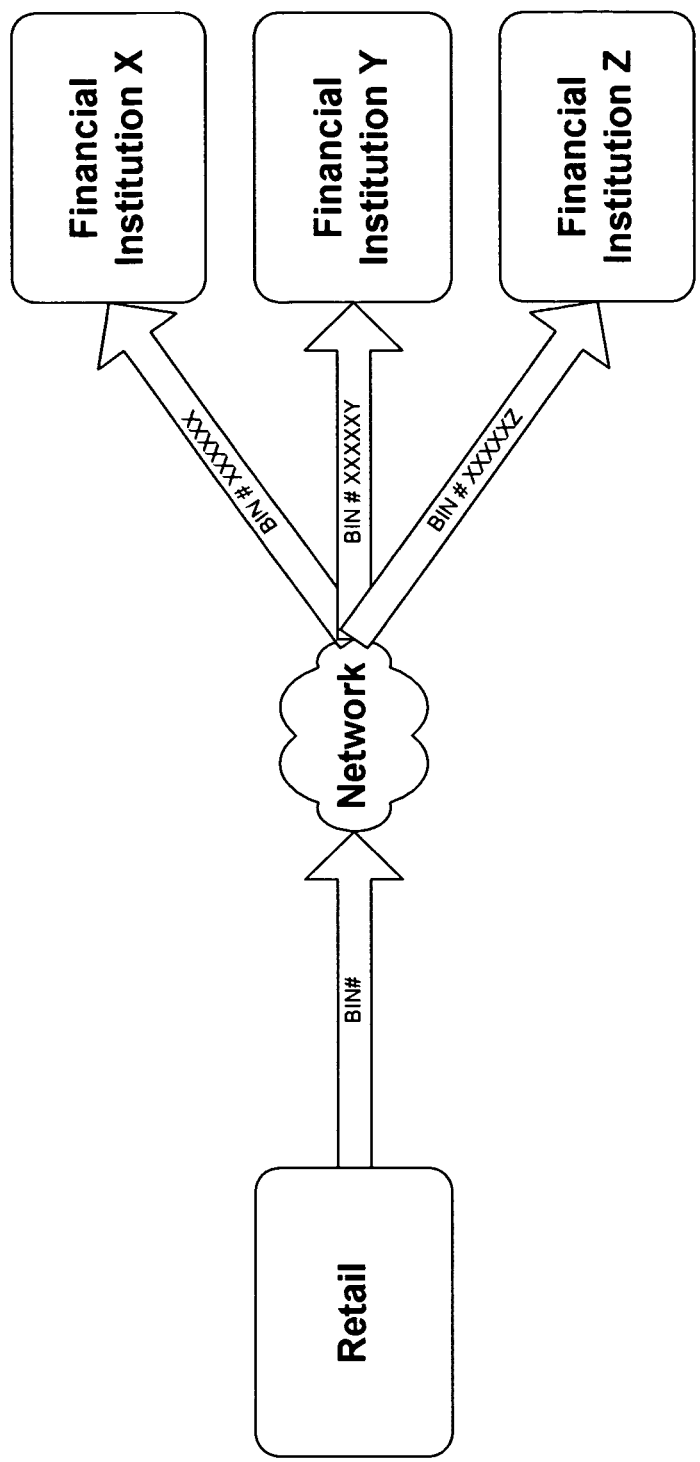
FIG. 2 is a high level network diagram illustrating how BINs are used to route messages to Financial Institutions or card issuers.

A more detailed description of embodiments of the present invention follows. As mentioned, embodiments of the present invention adopt the concept of Bill of Materials. One definition of a Bill Of Materials ("BOM") is that it describes a product in terms of its assemblies, subassemblies and basic parts. BOM is hierarchical and for each level of the hierarchy in a model, appropriate levels of activities required for an element associated with that level are added. Another definition of a BOM is a listing of all subassemblies, intermediate parts and raw materials that go into a parent assembly showing the quantity of each required to make an assembly. With the foregoing in mind and for purposes of explanation, assume a "feature set" for a card/account offering includes the following:

1. 2% interest on the balance
2. Frequent flyer incentive program 'A'
3. Card stock 'X' with all its associated artwork
4. Fee structure 'Y' for various types of per-transaction charges.
5. Regional or National network (rail) 'Z' (e.g. Visa/Plus)

Using the Bill of Materials ("BOM") concept from manufacturing, each feature would be assigned a "part number". For this example, the numbers 001, 002, 003, 004, and 005 (in order) may be arbitrarily assigned. For a "top level" part number, a unique number of, e.g., CB-001 may be assigned, and this number (CB-001) may be designated as a "tracking number" or ID. Of course, any number scheme may be used.

Thus, a typical hierarchical BOM showing this product structure can be depicted using an indented list as shown below:

CB-001
  001
  002
  003
  004
  005

Next, and as shown in FIG. 4, any card issued which is to be assigned the feature set represented by the tracking number CB-001 would have that number associated with the card number (or range) in the issuer's card/account database. This can be done as simply as including the tracking ID in the master record for a card, or in a record or structure (table, etc.) designed specifically to associate that tracking ID with a range of BIN/Account number(s)—in a zero to many relationship.

To create a new product offering which does not offer, e.g., a 2% interest rate on the balance, but is identical in all other respects, a new tracking ID would be generated, as shown in the following depiction:

CB-002
  002
  003
  004
  005

Using such structures stored in such a way as to be able to determine in real time whether a feature is supported, and its nature, as various transactions (purchase, ATM withdrawal, month-end processing) occur, allows for continuing product evolution with little overhead, fast implementation time for changes, and no requirement for large portions of a BIN to be set aside, thus making much more efficient use of the BIN numbering space.

As will be appreciated by those skilled in the art, during subsequent processing of transactions or monthly processing, etc., the tracking number may be used to determine which interest rates, incentive programs, card stock, and fee structures, and networks are associated with the card—said features/values being used during processing to direct the proper outcome and behavior of the card relative to transactions, etc.

Also, as a result of using a tracking number as described herein, there can be anywhere from 1 to 1,000,000,000 tracking numbers actively associated with each single sixteen digit account—potentially as many as one per issued card, and no BIN/account number need be "wasted" by being reserved for other cards with the same feature set.

A desirable consequence of this method is that numbers are issued in a dense rather than sparse manner, either randomly or sequentially, without the need to set aside for a given "feature set" many additional available numbers which may potentially never be used.

Lastly, the tracking number also has use beyond the card numbers/accounts and transaction processing, since the tracking number can also be used to indicate and track which literature accompanies the card when it is shipped to the consumer, which marketing organization or merchant sold the card, which regulatory disclosures accompany the card, what recordings/behavior the cardholder encounters when using an IVR (interactive voice response) system by phone, how a call is answered and processed by human operators at a call center, or the look/feel and features offered at a website via the internet, among many other possible uses.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. For instance, the "credit cards" described herein should be understood to also broadly include debit cards, checking cards (open-loop), and even closed-loop cards.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on any claims.

What is claimed is:

1. A method of managing feature sets associated with credit card account numbers, comprising:
storing, by a processor, in a first database coupled to a network, a plurality of credit card account numbers;
storing, by the processor, in a second database coupled to a network, a list of tracking numbers, wherein each tracking number represents a group of credit card account features, wherein a feature set, made of one or more features, is assigned a unique tracking number;
assigning, by the processor, a tracking number to a credit card account number, the credit card account number including a banking identification number (BIN) and a sub-BIN and a customer account number, the tracking number associating the credit card account number with a predetermined feature set;
issuing, by the processor, a credit card account number to a credit card customer; and maintaining, by the processor, the issued credit card account number even when the predetermined feature set is modified thereby avoiding re-issuing any of a BIN, a sub-BIN, customer account number or a credit card to the customer; and
indicating, by the processor, literature to be included with the credit card based upon the tracking number and a bank issuing the credit card based upon the tracking number.

2. The method of claim 1, wherein the first and second databases are in the form of tables.

3. The method of claim 1, wherein the first and second databases are logically separate but are implemented on a single physical device.

4. The method of claim 1, wherein the predetermined feature set includes an interest rate.

5. The method of claim 1, wherein the predetermined feature set includes an identification of an incentive program.

6. The method of claim 1, wherein the predetermined feature set includes an identification of a fee structure.

7. The method of claim 1, wherein the predetermined feature set includes an identification of a type of artwork to be placed on a card.

8. The method of claim 1, wherein the predetermined feature set includes an identification of a regional or national network to which an account is associated.

9. The method of claim 1, wherein at least one tracking number tracks a type of literature that should accompany a credit card that is associated with a given one of the credit card account numbers when shipped to a customer.

10. The method of claim 1, wherein at least one tracking number tracks an entity that sold a credit card.

11. The method of claim 1, wherein at least one tracking number identifies which disclosures should accompany a credit card that is associated with a given one of the credit card account numbers when shipped to a customer.

12. The method of claim 1, wherein at least one tracking number identifies which recordings are to be played when a customer encounters an interactive voice response (IVR) system.

13. The method of claim 1, wherein at least one tracking number identifies which features are to be displayed when a customer accesses a website via the internet.

14. A method of assigning credit card account numbers, comprising;
    storing, by a processor, a credit card account number in a first database coupled to a network, wherein the credit card account number comprises a bank identification number (BIN), a sub-BIN, an account number and a verification or validation value;
    storing, by the processor, a list of tracking numbers in a second database coupled to a network, wherein each tracking number represents a feature set of one or more credit card account features, wherein each feature is assigned a unique tracking number and the tracking number links the credit card account number with the feature set;
    assigning, by the processor, one of the tracking numbers to the credit card account number such that the credit card account number is associated with a predetermined feature set;
    issuing, by the processor, a credit card account including a particular BIN, a particular sub-BIN and an particular account number to a credit card customer, a tracking number associated with the issued credit card account linking the issued credit card account with a particular feature set; and
    maintaining, by the processor, the issued credit card account number even when the particular feature set is modified thereby avoiding re-issuing of a BIN, a sub-BIN, customer account number or a credit card to the customer.

15. The method of claim 14, wherein the predetermined feature set includes an interest rate.

16. The method of claim 14, wherein the predetermined feature set includes an identification of an incentive program.

17. The method of claim 14, wherein the predetermined feature set includes an identification of a fee structure.

18. The method of claim 14, wherein the predetermined feature set includes an identification of a type of artwork to be placed on a card.

19. The method of claim 14, wherein the predetermined feature set includes an identification of a regional or national network to which an account is associated.

20. The method of claim 14, wherein the one of the tracking number tracks a type of literature that should accompany a credit card that is associated with the credit card account numbers when shipped to a customer.

21. The method of claim 14, wherein one of the tracking number tracks an entity that sold a credit card.

22. The method of claim 14, wherein one of the tracking number identifies which disclosures should accompany a credit card that is associated with the credit card account numbers when shipped to a customer.

23. The method of claim 14, wherein one of the tracking number identifies which recordings are to be played when a customer encounters an interactive voice response (IVR) system.

24. The method of claim 14, wherein one of the tracking number identifies which features are to be displayed when a customer accesses a website via the internet.

25. A method of assigning a features set to individual ones of the credit card numbers in a database storing a plurality of credit card numbers, comprising:
    storing, by a processor, the plurality of credit card account numbers;
    separately storing a list of tracking numbers by the processor, wherein each tracking number represents a feature set of credit card account features, wherein each feature set is assigned a unique tracking number; and
    assigning, by the processor, a tracking number to a credit card account number such that such credit card account is each associated with a predetermined feature set;
    Issuing, by the processor, a credit card account to a customer, the credit card account number having an associated banking identification number (BIN) and a sub-BIN; and
    maintaining, by the processor, the issued credit card account number even when the predetermined feature set is modified thereby avoiding re-issuing another credit card number, BIN, or sub-BIN to the customer; and
    indicating, by the processor, literature to be included with the credit card based upon the tracking number.

26. A method of managing feature sets, as recited in claim 1, wherein the tracking number is used to identify a particular tracking literature to accompany a credit card assigned with at least one of the plurality of credit card account numbers when the credit card is shipped to the consumer, the tracking number further used to identify issuer of the credit card, disclosures accompanying the credit card, recordings/behavior recording or behavior that the cardholder of the credit card encounters when using an interactive voice response (IVR) system by phone, or how a call is answered and processed by human operators at a call center.

27. A method of managing feature sets, as recited in claim 1, wherein the credit card number associated with the predetermined feature set varies.

28. A method of managing feature sets, as recited in claim 1, wherein the credit card number is a range of credit card numbers.

* * * * *